Jan. 27, 1931.  W. B. GRIFFITH  1,790,467
ACCELERATED DRY PIPE VALVE
Filed June 29, 1927
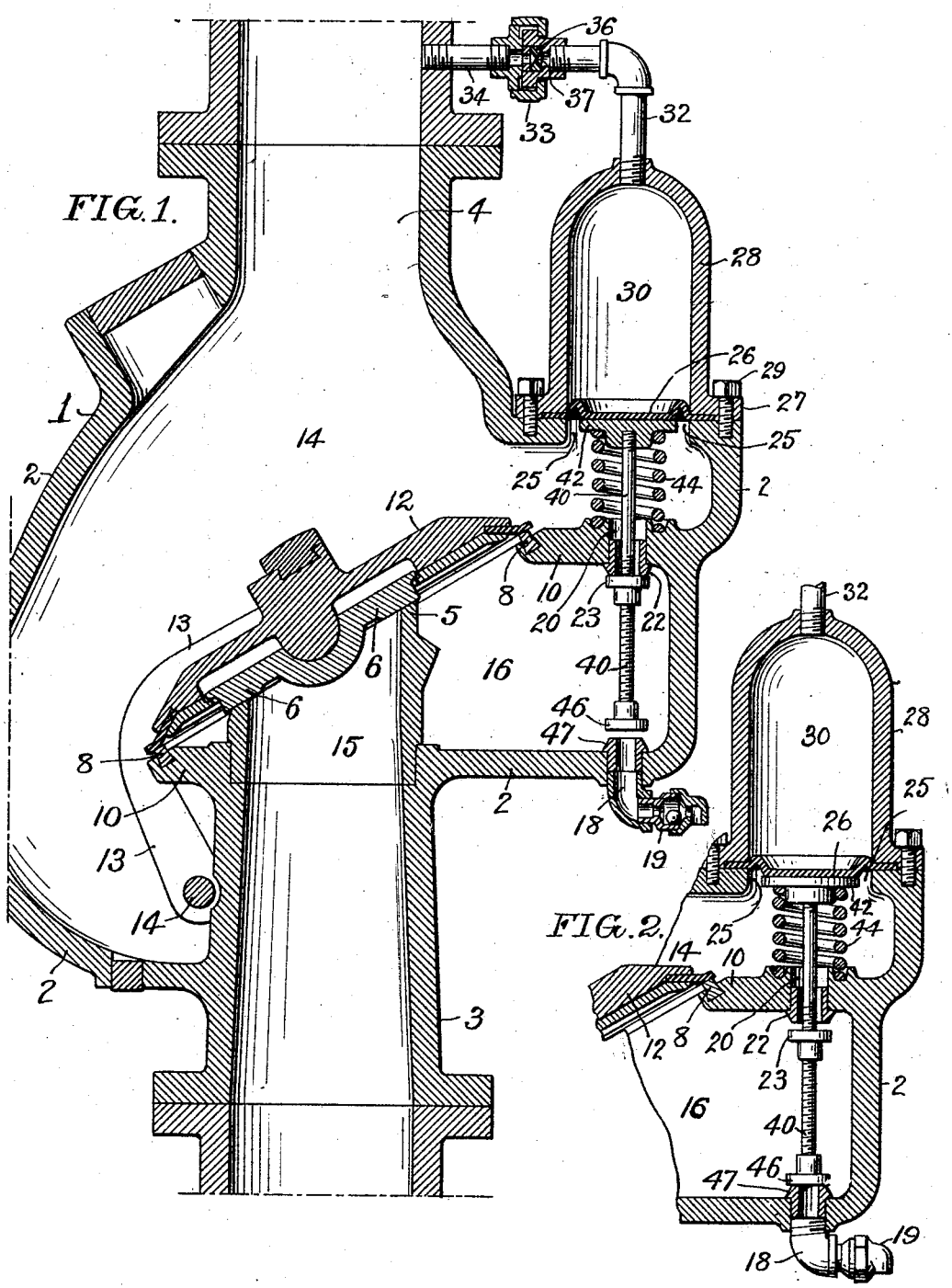
Inventor:
William B. Griffith
By F. DeWitt Goodwin
Attorney Patented Jan. 27, 1931

1,790,467

UNITED STATES PATENT OFFICE

WILLIAM B. GRIFFITH, OF AUDUBON, NEW JERSEY, ASSIGNOR TO STAR SPRINKLER CORPORATION, A CORPORATION OF NEW JERSEY

ACCELERATED DRY-PIPE VALVE

Application filed June 29, 1927. Serial No. 202,297.

My invention relates to improvements in dry pipe valves for use in sprinkler systems for fire protection, and particularly relates to an accelerator for increasing the speed of operation of the dry pipe valve when the sprinkler system is to be brought into operation.

The object of my invention is to provide a dry pipe valve with a direct means of transferring the air pressure from a chamber above the air clapper to a chamber below the air clapper for reducing the time required for the air clapper to open and bring the dry pipe valve into operation; a further object is to combine an accelerator with the dry pipe valve whereby the casing, or housing, of the dry pipe valve will enclose the accelerator valve; a still further object is to locate the accelerator valve immediately adjacent to the clapper of the dry pipe valve, thus eliminating all pipe connection leading to a separate accelerator unit, thereby reducing the time required for the pressure to be brought into action to assist in opening the dry pipe valve clapper; a still further object is to couple the accelerator valve with the drip valve clapper whereby the latter will be closed at the instant the accelerator valve opens, thus avoiding the loss of any pressure through the drip valve; and a still further object is to combine the accelerator with the dry pipe valve as a single unit for the purpose of reducing the number of parts and pipe connections, thus saving in the cost of manufacture and providing a unit which occupies less space than the separate units now in general use.

Referring to the accompanying drawing, Figure 1 is a vertical sectional view of a dry pipe valve embodying my novel form of accelerator as a unit construction; and Figure 2 is a partial sectional view similar to Figure 1, showing the accelerator valve open and the drip valve closed.

In the drawing, in which like reference characters refer to like parts, 1 represents a dry pipe valve comprising a casing 2 having the usual inlet pipe 3 and outlet pipe 4, forming inlet and outlet passageways through the casing 1.

The inlet pipe 3 is provided with a water valve seat 5 adapted to be closed by a water clapper 6. Surrounding the water valve seat 5 is an air valve seat 8, formed upon a web 10 within the casing 1, which web forms an integral part of the casing. The air valve seat 8 is closed by an air clapper 12. In the form shown in the drawing the air clapper and water clapper are mounted upon a single arm 13 pivotally mounted upon a shaft 14 secured within the casing 1. Any desired form of clappers may be used.

When the clappers 6 and 12 are closed, as shown in the drawing, an air pressure chamber 14 is formed above the air clapper and a water pressure chamber 15 is formed within the inlet pipe whereby a high water pressure is confined by a relatively lower air pressure, due to the difference in the sizes of the air and water clappers. An intermediate or neutral chamber 16 is formed within the casing 1 between the air clapper 12 and the water clapper 6. Said chamber 16 is normally open to the atmosphere through the drip pipe 18. The latter is usually provided with a ball check valve 19 for preventing the outlet of water when the clappers are open and water is flowing through the casing 1.

The web 10 of the casing 1 is provided with an aperture 20 forming a passageway between the air chamber 14 and the intermediate chamber 16. Said passageway or aperture 20 is provided with a removable valve seat 22 upon which a valve 23 closes for shutting off communication through said aperture 20.

The casing 1 is provided with an opening 25 formed in its outer wall 2, which opening 25 is closed by a flexible diaphragm 26, held upon the casing 1 by the flange 27 of an air container 28, which flange 27 is secured by fastening devices 29 to the casing 1. Said container 28 forms a chamber 30, which is closed by the diaphragm 26. A pipe 32 connects said chamber 30 with a slow leak device 33, which in turn is connected through a pipe 34 with the air chamber 14 of the system above the air clapper 12. Said slow leak device 33 consists of a part 36 having a minute aperture 37 through which the air pressure slowly passes to normally maintain an equal air pressure in the chambers 14 and 30.

The accelerator valve 23 is secured upon a rod 40 which passes through the aperture 20 formed in the web 10. Upon the upper end of said rod 40 is secured a disk 42 which supports the diaphragm 26. Said disk is supported by a spring 44 which in turn is supported upon the web 10 of the casing 1. Said spring 44 is of sufficient resiliency to hold the valve 23 closed upon its seat against the air pressure within the air pressure chamber 14 above the air clapper 12. The rod 40 at its lower end is provided with a drip pipe valve or clapper 46 which is normally held by said rod 40 in spaced relation with the valve seat 47 surrounding the drip pipe 48, thus normally keeping the drip pipe open.

The operation of my invention is as follows: The air and water clappers 6 and 12 are closed upon their seats as shown in the drawing. Air is forced into the system above the air clapper and maintained at a sufficient pressure to hold the water clapper 6 closed against the water pressure in the chamber 15. The spring 44 holds the accelerator valve 23 closed so that the air pressure will enter the chamber 30 in the container 28 through the slow leak device 33, until said pressure is equal in the chambers 14 and 30. When the system is opened through a sprinkler head (not shown in the drawing), the air pressure in the chamber 14 is reduced but the air pressure in the container chamber 30 is maintained sufficiently by the slow leak device to cause the air in the chamber 30 to expand and move the diaphragm 26 against the action of the spring 44 and the reduced pressure in the chamber 14, thus opening the valve 23 and allowing the air pressure to pass rapidly through the aperture 20 into the intermediate chamber 16, so that the air pressure will equalize in the chambers 14 and 16, thus causing the clappers 6 and 12 to open at an earlier period of time than they would if the intermediate chamber 16 contained air at atmospheric pressure. It will be understood, as above described, that the drip pipe valve 46 is closed simultaneously with the opening of the valve 23, thus confining the air pressure within the chamber 16 until the air clapper 12 opens. The opening of the air clapper takes place before the air pressure in the container is reduced sufficiently to allow the spring 44 to again close the valve 23 and open the drip valve 46. By embodying the dry pipe valve with my novel accelerator and locating the accelerator valve 23 within the main valve casing, the air pressure which has been holding the air clapper 12 closed is transferred immediately, upon the initial reduction of air pressure in the system, to the underside of the air clapper so that the pressures above and below the air clapper are equalized, thus permitting the air and water clappers to open, when there is still high air pressure in the system, by the action of the water pressure upon the underside of the water clapper.

I claim:—

1. A dry pipe valve comprising a casing having an inlet passage and an outlet passage through which water is supplied to a sprinkler system, a water clapper closing said inlet passage, a web upon the inner surface of the walls of the casing, a valve seat upon said web, an air clapper adapted to close upon said seat forming an air chamber above the air clapper and forming an intermediate chamber between said clappers, said air clapper operatively associated with the water clapper, said web having a passageway formed therethrough located between said valve seat and the outer wall of the casing, a valve for closing the latter, and means for opening said last mentioned valve upon a sudden reduction of air pressure above said air clapper for admitting the air under pressure into said intermediate chamber through the passageway formed in the web.

2. A dry pipe valve comprising a casing having an inlet and an outlet passage through which water is supplied to a sprinkler system, a water clapper for closing said inlet passage, a web upon the inner surface of the wall of the casing, a valve seat upon said web, said casing having an air pressure chamber formed therein located between said web and said outlet, an air clapper held upon said seat by air under pressure within the casing above said web for holding the water clapper closed, an intermediate chamber within said casing located between said clappers, said web having a passageway communicating between said air pressure chamber and said intermediate chamber, an accelerator valve located upon said web for controlling said passageway formed through said web leading to said intermediate chamber, means for normally holding the accelerator valve closed upon the web, a container having an open end communicating with an opening in the casing above the web, a movable member held between said container and said casing thereby to separate the casing from said chamber, a connection between said container and said air pressure chamber forming a restricted passage for the air pressure to slowly pass, a rod interposed between said member and said accelerator valve whereby the air pressure in the container upon a sudden reduction of pressure in said pressure chamber will actuate said member and said rod for opening the accelerator valve.

3. A dry pipe valve comprising a casing having an inlet and an outlet passage, a water clapper for closing said inlet passage, an air pressure chamber within said casing, an air clapper held in the closed position by air under pressure within said air chamber adapted for holding the water clapper closed, an intermediate chamber within said casing separated from said air chamber by the air clapper and having a passageway communicating with said air chamber, an accelerator valve located within said casing adapted for controlling said passageway between said air chamber and said intermediate chamber, a container mounted upon said casing, a connection between said container and said air pressure chamber forming a restricted passage for the air under pressure to slowly pass, a movable member in said container, a rod secured to said movable member, said accelerator valve mounted upon said rod, said casing having a drip aperture formed therein, and a drip valve secured upon said rod adapted to close the drip aperture when said rod is moved by a greater pressure in the container than that in the air pressure chamber for opening the accelerator valve.

4. A dry pipe valve comprising a casing having an inlet passage and an outlet passage, a water clapper closing said inlet passage, a web within the casing, a valve seat upon said web, an air clapper adapted to close upon said seat forming an air chamber above the air clapper and an intermediate chamber between said clappers, said air clapper operatively associated with the water clapper, said web having a passageway formed therethrough, an accelerator valve for closing the latter, a rod upon which the accelerator valve is mounted, a spring tending to hold said accelerator valve closed, said casing having a drip aperture formed therein, a drip valve upon said rod normally held in open position, a container mounted upon said casing, a connection between said container and said air pressure chamber through which the pressure therein will slowly equalize, and a movable member in said container for actuating said rod upon a sudden reduction of pressure in said air pressure chamber.

5. A dry pipe valve comprising a casing having an inlet and an outlet passage through which water is supplied to a sprinkler system, a water clapper for closing said inlet passage, a web upon the inner surface of the wall of the casing, a valve seat upon said web, said casing having an air pressure chamber formed therein located between said web and said outlet, an air clapper held upon said seat by air under pressure within said air chamber of the casing for holding the water clapper closed, an intermediate chamber within said casing located between said clappers, said web having a passageway communicating between said air pressure chamber and said intermediate chamber, an accelerator valve upon said web located between the air clapper seat and the outer wall of the casing for controlling said passageway formed in the web leading to said intermediate chamber, means for normally holding the accelerator valve closed upon the web, a container having an open end communicating with an opening in the casing above the web, and a movable member held between said container and said casing thereby to separate the casing from said chamber, a connection between said container and said pressure chamber forming a restricted passageway, a connecting part between said movable member and said accelerator valve whereby the pressure in the container upon a sudden reduction of pressure in said air pressure chamber will actuate said member for opening the accelerator valve.

In testimony whereof I affix my signature.

WILLIAM B. GRIFFITH.